United States Patent
Stander et al.

[11] Patent Number: 6,006,153
[45] Date of Patent: Dec. 21, 1999

[54] DISCRETE PROCESSING CATALYST MONITORING

[75] Inventors: Douglas M. Stander, Grosse Pt. Woods, Mich.; Andrew C. Bartlett, Westborough, Mass.

[73] Assignee: Chrysler Corporation, Auburn Hill, Mich.

[21] Appl. No.: 09/177,319

[22] Filed: Oct. 22, 1998

[51] Int. Cl.$^6$ .......................... G01M 15/00; F01N 03/28
[52] U.S. Cl. ................. 701/109; 73/23.32; 73/118.1; 60/276
[58] Field of Search .................. 60/276, 277; 73/23.31, 73/23.32, 118.1, 116, 117.2, 117.3; 701/103, 109

[56] References Cited

U.S. PATENT DOCUMENTS

| | | | |
|---|---|---|---|
| 5,255,515 | 10/1993 | Blumenstock et al. | 60/276 |
| 5,265,416 | 11/1993 | Hamburg et al. | 60/277 |
| 5,272,872 | 12/1993 | Grutter et al. | 60/277 |
| 5,319,921 | 6/1994 | Gopp | 60/276 |
| 5,341,642 | 8/1994 | Kurihara et al. | 60/276 |
| 5,363,646 | 11/1994 | Orzel et al. | 60/276 |
| 5,363,647 | 11/1994 | Ohuchi et al. | 60/276 |
| 5,400,592 | 3/1995 | Mukaihira et al. | 60/276 |
| 5,553,450 | 9/1996 | Schnaibel et al. | 60/276 |
| 5,633,456 | 5/1997 | Stander et al. | 73/116 |
| 5,640,846 | 6/1997 | Ohuchi et al. | 60/276 |
| 5,758,491 | 6/1998 | Agustin et al. | 60/276 |
| 5,848,528 | 12/1998 | Liu | 60/276 |

*Primary Examiner*—George Dombroske
*Attorney, Agent, or Firm*—Mark P. Calcaterra

[57] ABSTRACT

A catalyst monitoring system is provided for monitoring catalyst efficiency in a catalytic converter of a motor vehicle. The catalyst monitoring system includes a catalyst monitor receiving electrical signals indicative of oxygen in the exhaust gas from a first oxygen sensor positioned between the vehicle's engine and the catalytic converter and a second oxygen sensor positioned downstream from the catalytic converter. Each of these input signals are filtered in the catalyst monitor such that a particular range of frequencies that encapsulate information regarding catalyst efficiency are passed. The filtered signals are then used to establish an amplitude ratio between the downstream oxygen signal and the upstream oxygen signal, such that the algorithm output linearly correlates to catalyst efficiency of the catalytic converter. Digital signal filtering is preferably implemented using a finite impulse response bandpass filter, a full-wave rectifier, a low pass filter, a sampler and a signal normalizer. A means for detecting a stabilized output signal may optionally be used in conjunction with the catalyst monitor.

14 Claims, 10 Drawing Sheets

DISCRETE PROCESSING CATALYST MONITORING

BACKGROUND OF THE INVENTION

1. Field of the Invention

The present invention relates generally to catalyst monitoring in a motor vehicle and, more particularly, to a method and apparatus for monitoring catalyst efficiency in a catalytic converter based on frequency characteristics of the catalyst as measured by oxygen sensors.

2. Discussion

Catalytic converters are used to reduce major air pollutants, such as hydrocarbons (HC), carbon monoxide (CO) and oxides of nitrogen ($NO_x$), contained in the exhaust gas from an internal combustion engine of a motor vehicle. Each converter contains catalysts that produce a heated chemical reaction that transforms noxious pollutants into less harmful carbon dioxide ($CO_2$) and water ($H_2O$) vapors. The catalytic converter is integrated downstream from the vehicle's engine into the vehicle's exhaust system. The effectiveness of reducing pollutants by a catalytic converter is highly dependent on the temperature and total gas throughput which, in turn, depends on the operational states and conditions of the internal combustion engine. Over time, catalyst efficiency degrades and thus decreases the capacity of the converter to convert toxic material. Government environmental regulations require continued reductions in vehicle emissions as well as accurate monitoring of various components of the emission system.

Therefore, it would be desirable to provide a non-intrusive method for monitoring catalytic converter efficiencies that is not dependent on any special vehicle operating conditions. In this way, catalyst monitoring can be performed under steady-state and transient vehicle operating conditions. Catalyst monitoring should linearly correlate its algorithm output to catalyst efficiency. In addition, it should be performed with minimal processing requirements and no additional sensors or circuitry as provided by a typical motor vehicle.

SUMMARY OF THE INVENTION

In accordance with the teachings of the present invention, a catalyst monitoring system is provided for monitoring catalyst efficiency in a catalytic converter of a motor vehicle. The catalyst monitoring system includes a catalyst monitor receiving electrical signals indicative of oxygen in the exhaust gas from a first oxygen sensor positioned between the vehicle's engine and the catalytic converter and a second oxygen sensor positioned downstream from the catalytic converter. Each of these input signals are filtered in the catalyst monitor such that a particular range of frequencies that encapsulate information regarding catalyst efficiency are passed. The filtered signals are then used to establish an amplitude ratio between the downstream oxygen signal and the upstream oxygen signal, such that the algorithm output linearly correlates to catalyst efficiency of the catalytic converter. Digital signal filtering is preferably implemented using a finite impulse response bandpass filter, a full-wave rectifier, a low pass filter, a sampler and a signal normalizer. A means for detecting a stabilized output signal may optionally be used in conjunction with the catalyst monitor.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
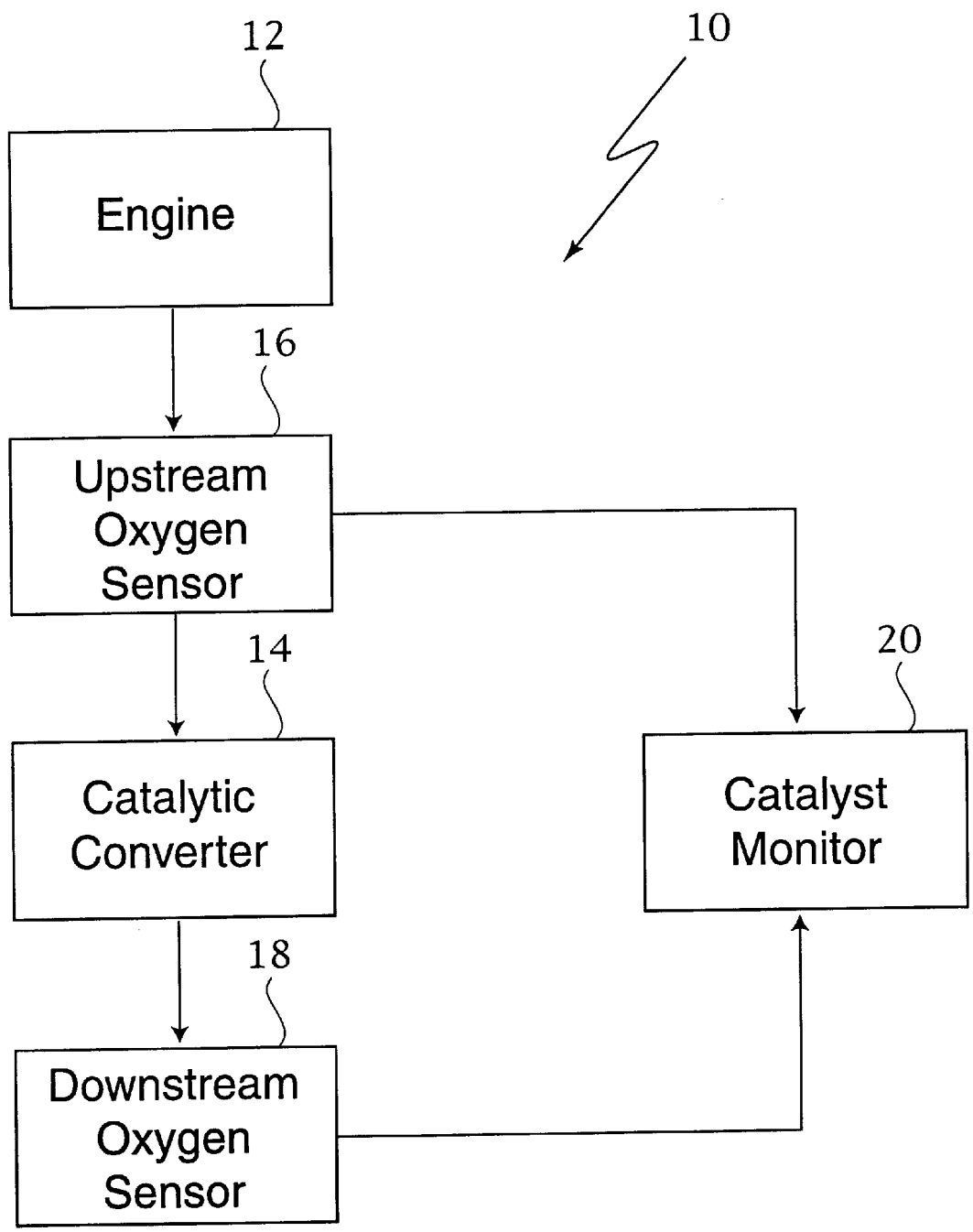
FIG. 1 is a block diagram showing the basic components of a catalyst monitoring system in accordance with the present invention.

The basic components of a catalyst monitoring system 10 are depicted in FIG. 1. Catalyst monitoring system 10 is generally comprised of an internal combustion engine 12 connected via an exhaust system to a catalytic converter 14. A first oxygen sensor 16 and a second oxygen sensor 18 are positioned upstream and downstream, respectively, from catalytic converter 14. Oxygen sensors 16 and 18 are non-linear (two-state) analog devices for detecting oxygen in exhaust gas as is well known in the art.

In accordance with the present invention, a method for monitoring catalyst efficiency in catalytic converter 14 is implemented in catalyst monitor 20. Catalyst monitor 20 is a non-intrusive monitor that may be executed in the background loop of engine control software embedded on a typical microcontroller. An electrical output signal (based on a greater than or equal to 20 Hz sampling rate) from each of the upstream oxygen sensor 16 and downstream oxygen sensor 18 serve as inputs to the present invention. Since monitoring need only occur once per trip (for approximately one minute), additional processing requirements on existing engine microcontrollers is minimal.

Figure 2A:
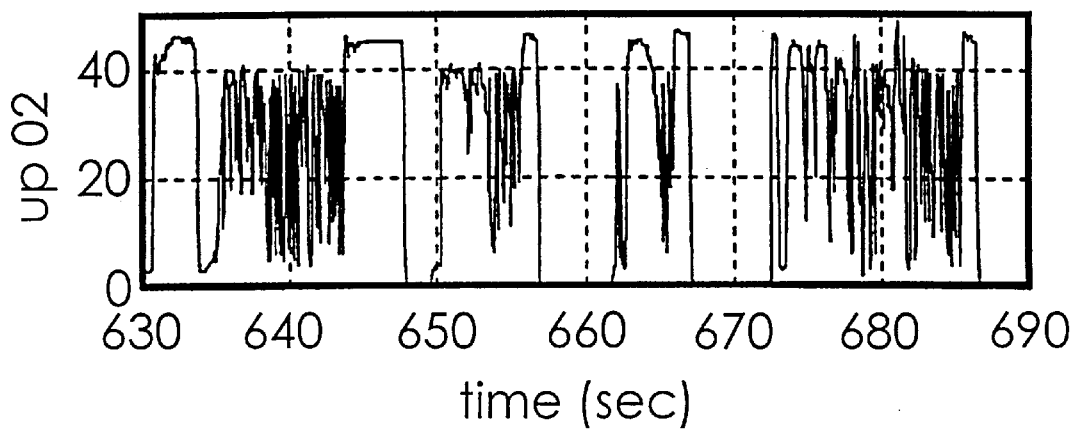
FIGS. 2A and 2B are diagrams illustrating the output signal from an upstream and downstream oxygen sensor, respectively, for a relatively high efficiency catalyst in accordance with the present invention.
Figure 2B:
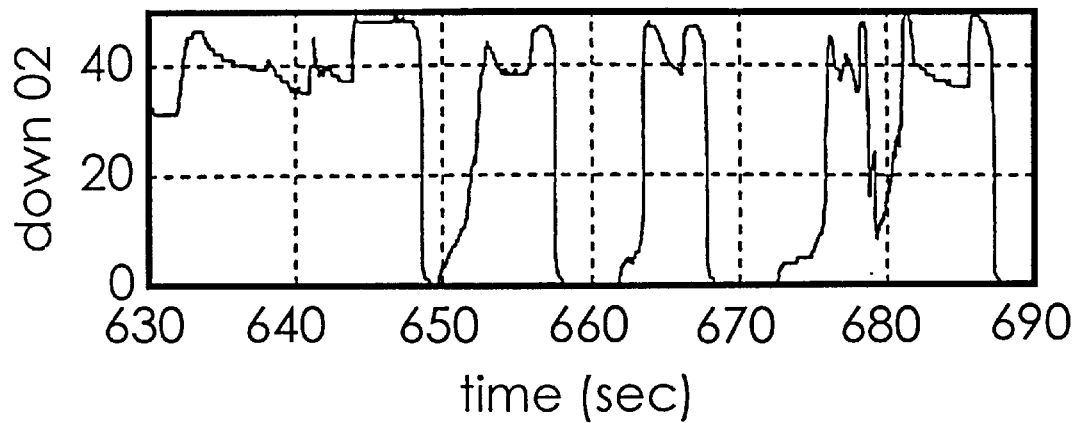
Figure 3A:
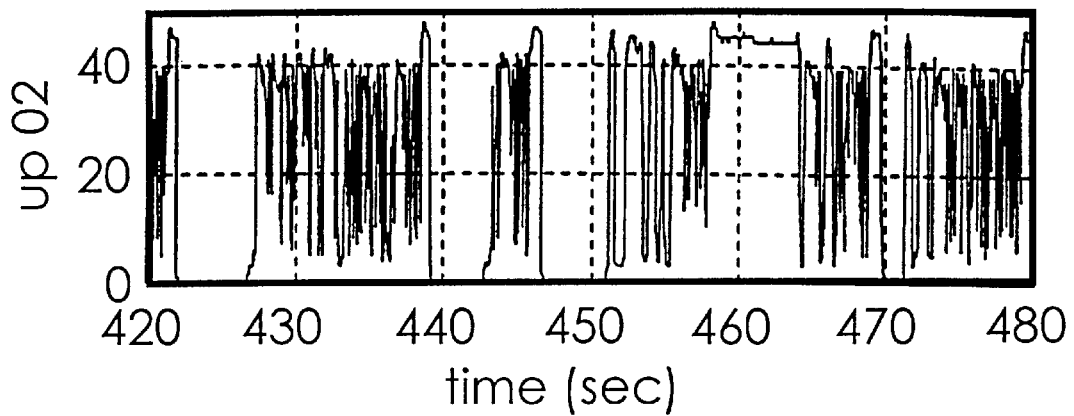
FIGS. 3A and 3B are diagrams illustrating the output signal from an upstream and downstream oxygen sensor, respectively, for a relatively low efficiency catalyst in accordance with the present invention.
Figure 3B:
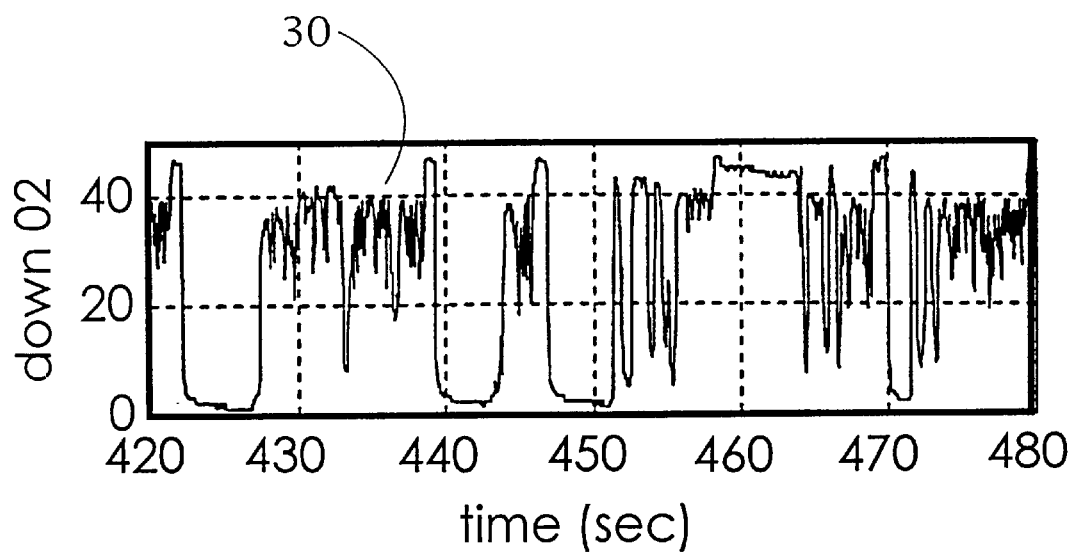

A typical signal as generated by upstream sensor 16 is shown in FIG. 2A. For a relatively high efficiency catalyst, the signal as measured by downstream oxygen sensor 18 in FIG. 2B demonstrates a substantially steady output in relation to the upstream signal. However, as the catalyst degrades, the oxygen storage capacity of the catalytic converter decreases. As a result, the output signal from the downstream oxygen sensor 18 begins to mimic the output signal from upstream oxygen sensor 16 as seen in FIGS. 3A and 3B. When properly filtered at an appropriate range of frequencies, this signal variation 30 provides information about catalyst efficiency. Thus, catalyst monitoring of the present invention is based on frequency characteristics of the catalyst as measured by oxygen sensors.

Figure 4A:
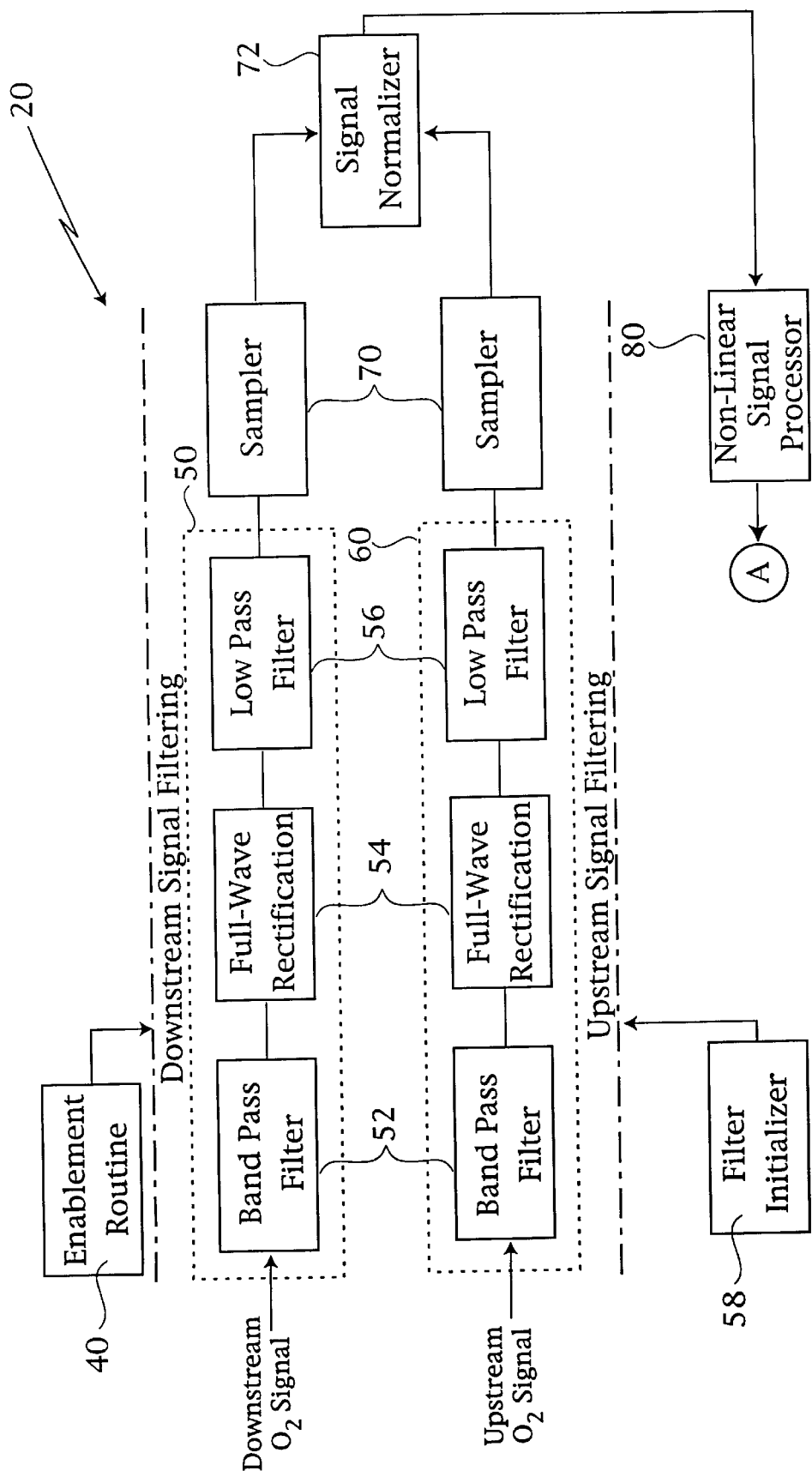
FIGS. 4A and 4B are block diagrams showing the first preferred embodiment of a catalyst monitor of the present invention.

FIG. 4A illustrates a more detailed implementation of catalyst monitor 20. In order to achieve reliable and consistent results, catalyst monitoring should be performed under known vehicle operating conditions. An enablement subroutine 40 evaluates whether numerous predefined operating conditions (e.g., minimum engine temperature, vehicle speed, ect.) have been met prior to initiating the monitoring process. In this way, catalyst monitoring is only performed under optimal testing conditions. It is envisioned that the present invention may be integrated with an existing means for triggering catalyst monitoring and can also be used in conjunction with other known catalyst monitoring techniques.

A downstream filter 50 receives a signal from downstream oxygen sensor 18, and an upstream filter 60 receives a signal from upstream oxygen sensor 16. Each of the downstream filter 50 and upstream filter 60 will focus its signal processing in a particular range (or bandwidth) of frequencies that encapsulate information regarding catalyst efficiency. For each of these filters, a sampler 70 receives the filtered signal and extracts a signal value representative of the signal using well known sampling or decimation techniques. Lastly, a signal normalizer 72 establishes an amplitude ratio (downstream/upstream) between these signal values, such that this algorithm output linearly correlates to catalyst efficiency of the catalytic converter.

Although they may be implemented in an analog form, downstream filter 50 and upstream filter 60 are preferably based on digital signal processing techniques. More specifically, downstream filter 50 and upstream filter 60 include a finite impulse response bandpass filter 52, a full-wave rectifier 54, and a low pass filter 56. Using Parks-McClellan optimal design methods, bandpass filter 52 is preferably constructed with 1 to 9 Hz passband having a passband ripple<3 db, as well as a stopband (above 10 Hz and also at DC) that attenuates at>40 db. These specifications are intended to extract the signal components that encapsulate information regarding catalyst efficiency. Rectifier 54 converts the signal received from bandpass filter 52 into an absolute value signal. Low pass filter 56 integrates (or averages) the rectified signal as well as attenuates any additional noise spikes being carried in the signal. To remove transient data at start up, a means for initializing 58 each of the filters can also be integrated into this signal processing. For a digital implementation, an analog-to-digital (A/D) converter (not shown) would be inserted between each of the oxygen sensors and its corresponding digital filter. Even with digital filters, minimal processing requirements are needed for implementation of the present invention on an existing engine controller.

It is also envisioned that the output from normalizer 72 may undergo some additional signal processing 80 to filter the signal and thus improve signal separation. In particular, nonlinear signal processing consists of filters and/or functions which enhance the signal to noise ratio. Preferably, nonlinear signal processing comprises multiplying the signal by itself (e.g., squaring the signal). Scaling of the signal may also be performed on the output signal from the nonlinear signal processor 80.

Figure 4B:
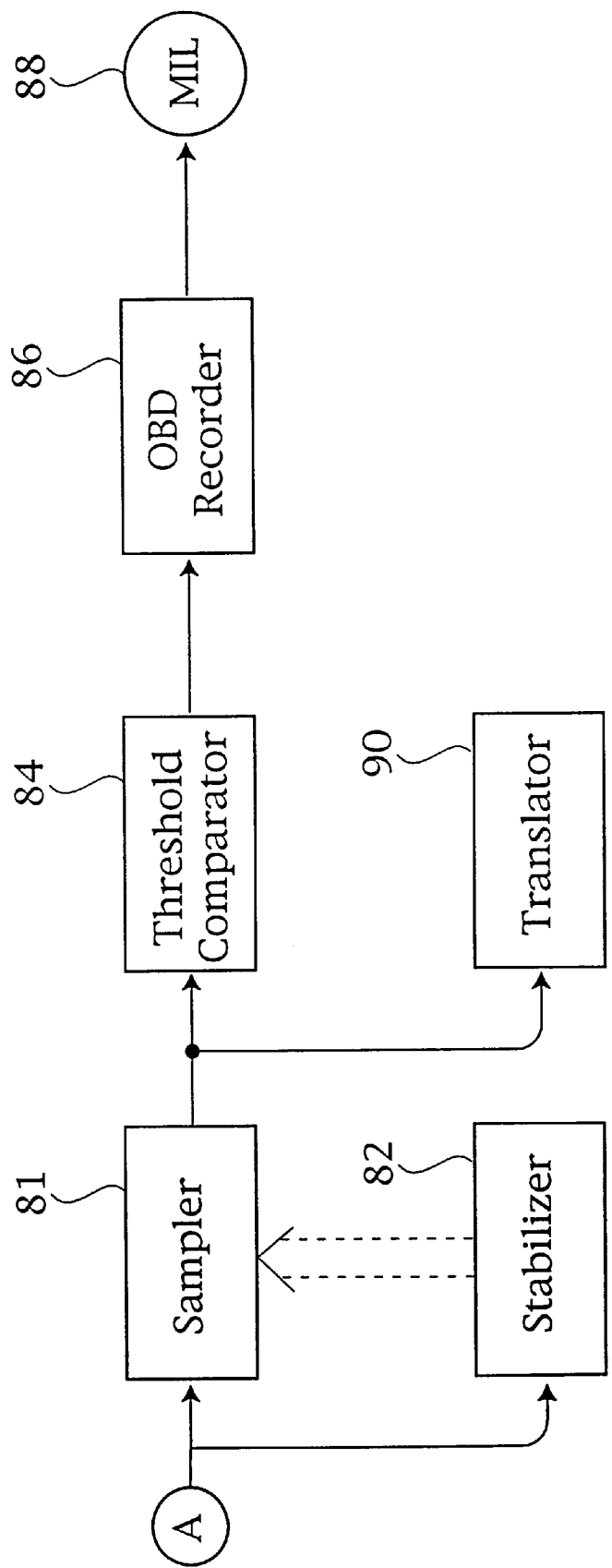
Figure 5A:
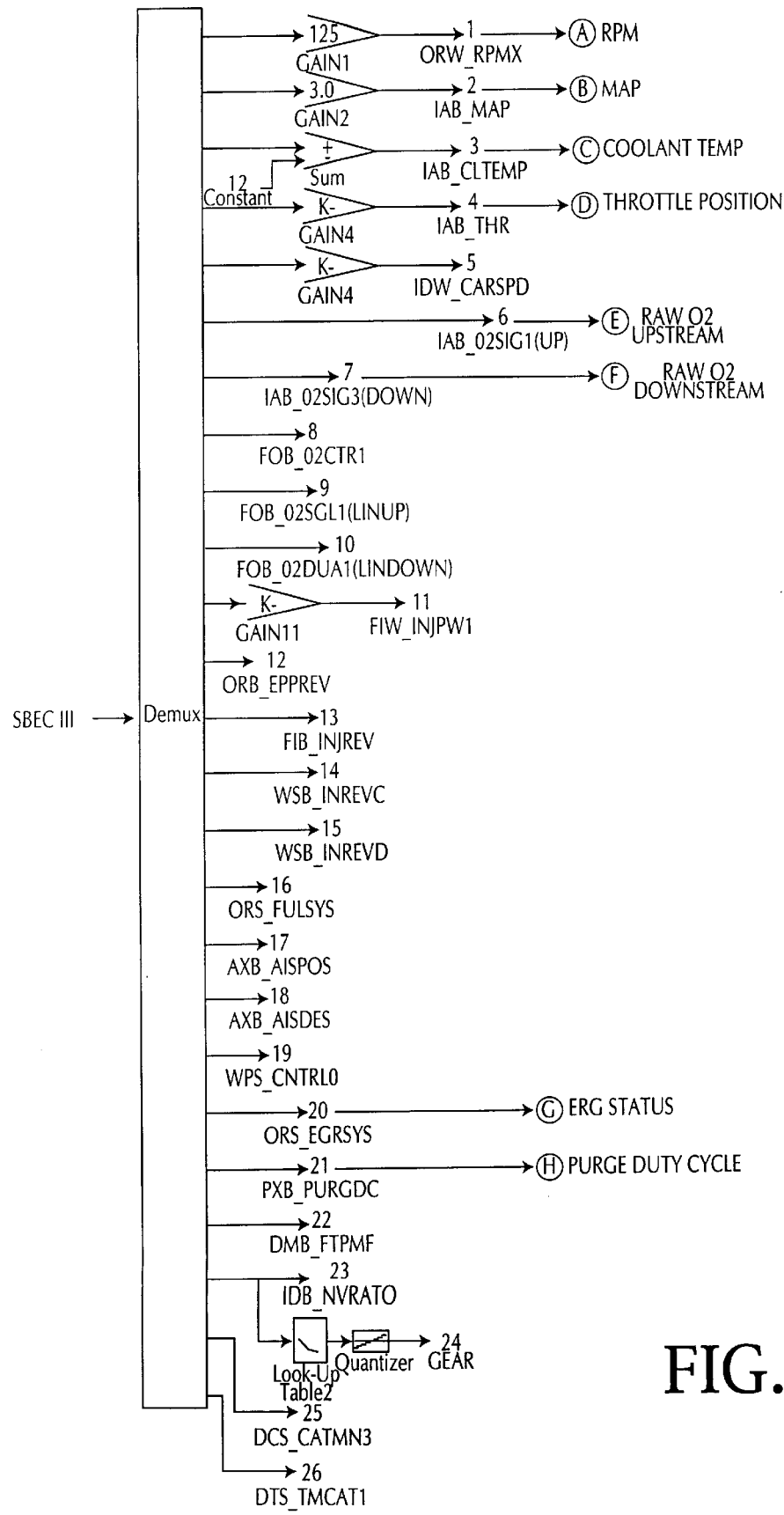
FIGS. 5A–5D are schematics showing a software implementation of a catalyst monitor of the present invention.
Figure 5B:
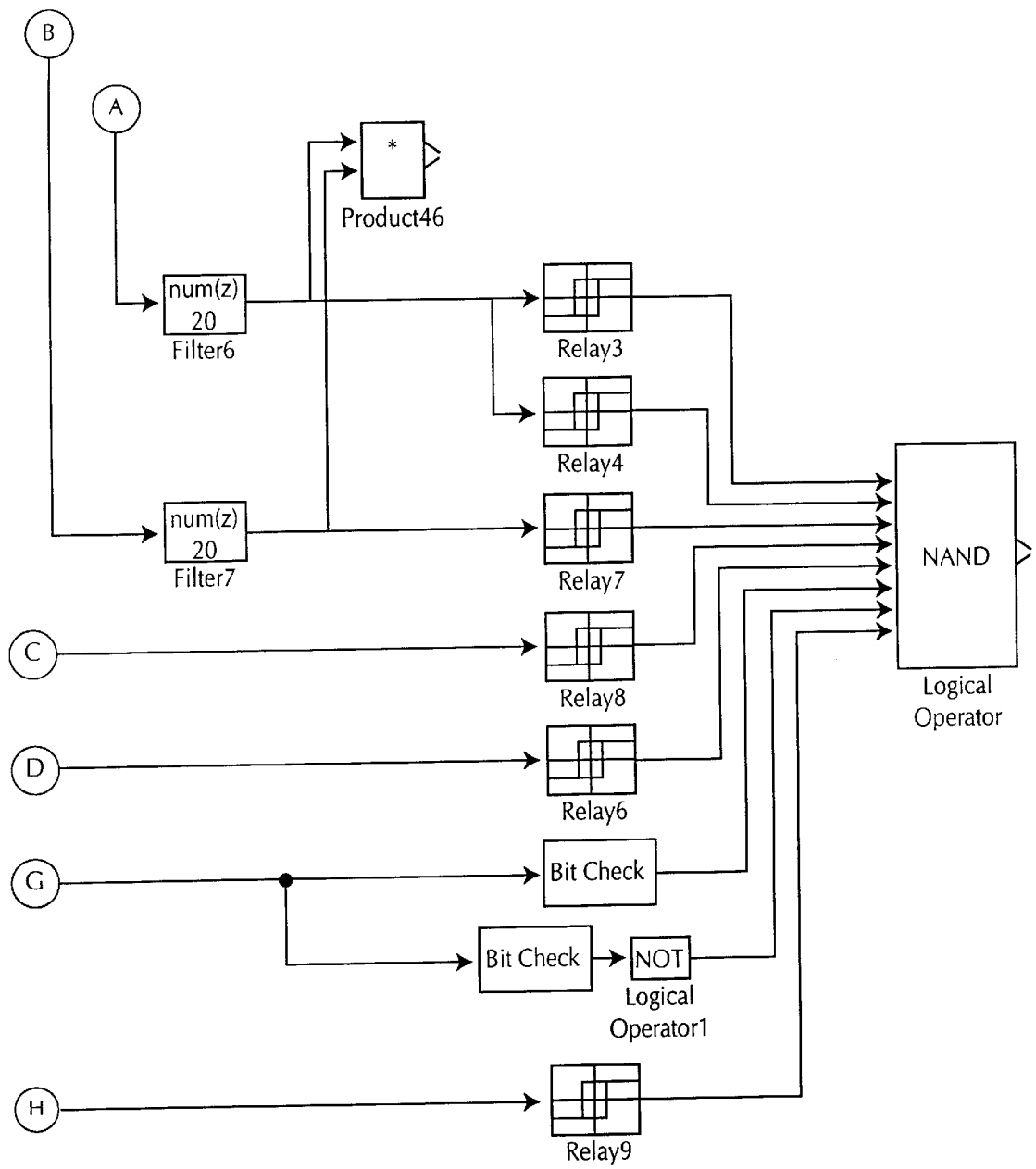
Figure 5C:
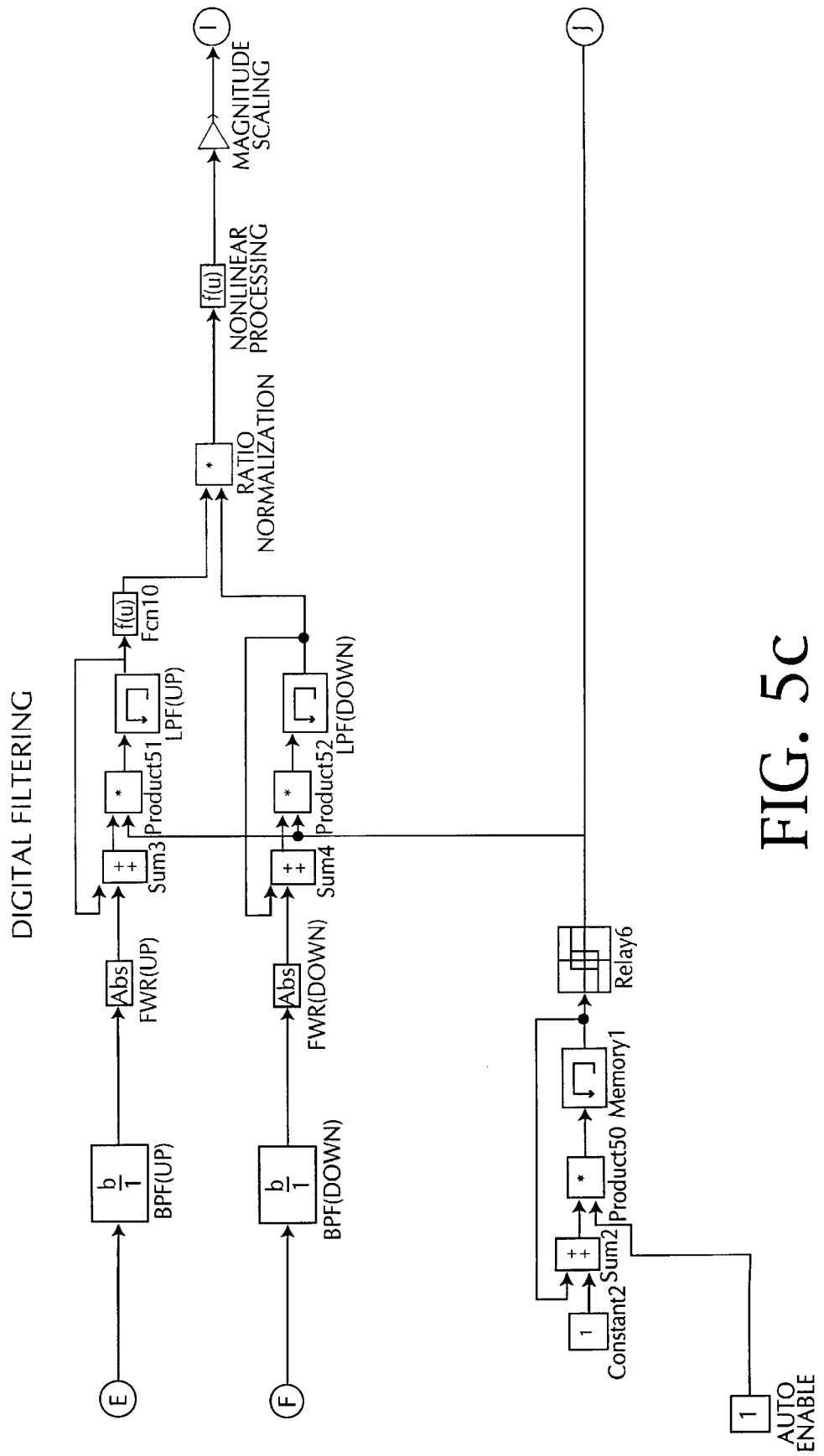
Figure 5D:
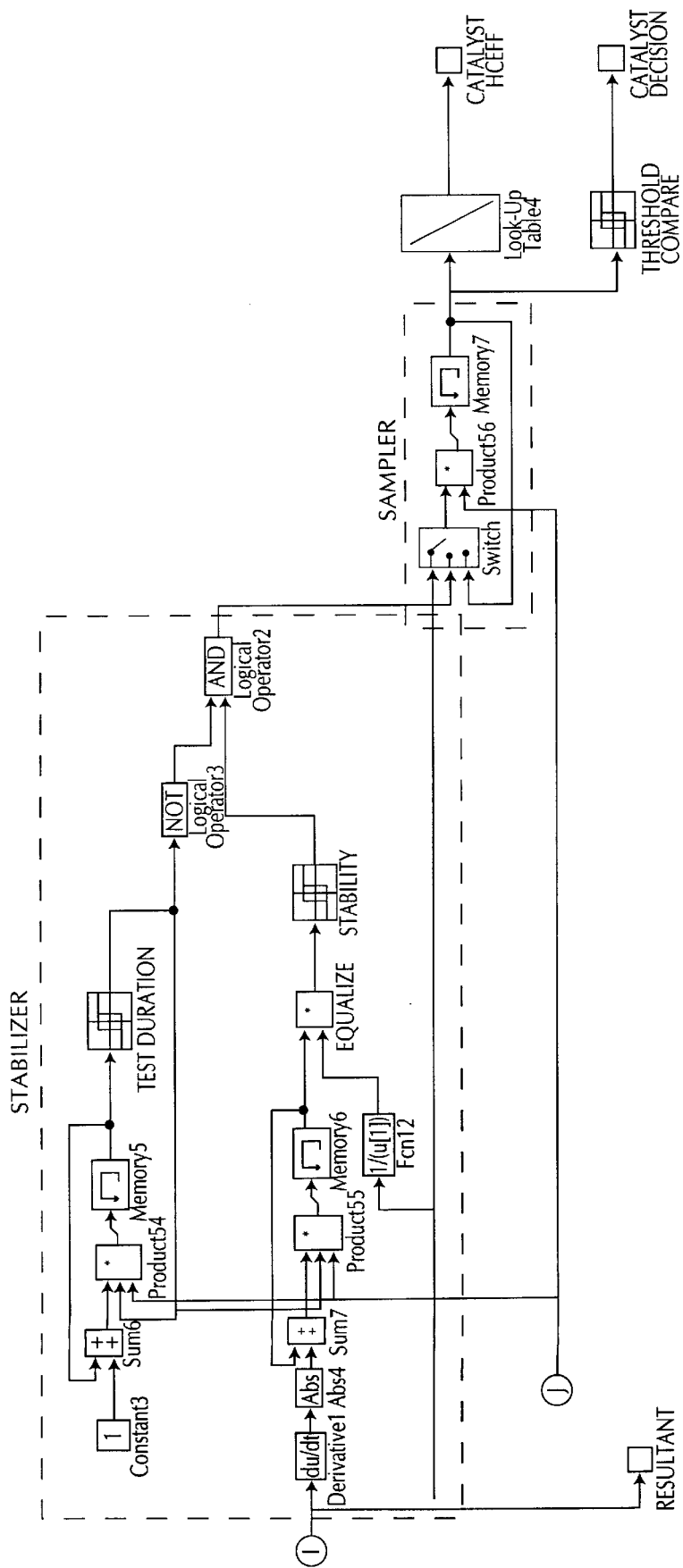

Generally, reasonable output stability in the above-described embodiment is reached within 30 seconds from initiation of the monitoring process. However, referring to FIG. 4B, a signal stabilizer 82 has been incorporated into catalyst monitor 20 to ensure that output is only captured after it has stabilized. An average change in the output signal is determined and then normalized with respect to the output signal. Thus, the normalized output signal is deemed to be stable once its value is less than a predetermined value. In a effect, a smaller amount of signal instability is permitted for small output signals; whereas a larger amount of signal instability is tolerated for larger output signals. Furthermore, the normalized output signal is combined with a timer mechanism such that a stable output signal is only permitted to pass through at predefined time intervals. The duration of the timer mechanism is based on the expected stability period (e.g., every 30 seconds) of the monitoring process.

Stabilized output from sampler 81 is then compared to predetermined thresholds to evaluate catalyst efficiency in a threshold comparator 84. Typically, these results are evaluated in compliance with government regulated on-board diagnostic (OBD) procedures in an OBD module 86. In addition, OBD module 86 may also send an electrical signal to illuminate a malfunction indicator light 88 positioned within view of the vehicle's driver. When catalyst efficiency fails predefined government requirements, OBD module 86 sends an electrical signal to illuminate the MIL 88. Lastly, stabilized output may optionally be translated by a translator 90 into a catalyst efficiency value through the use of empirically derived lookup tables.

Figure 6:
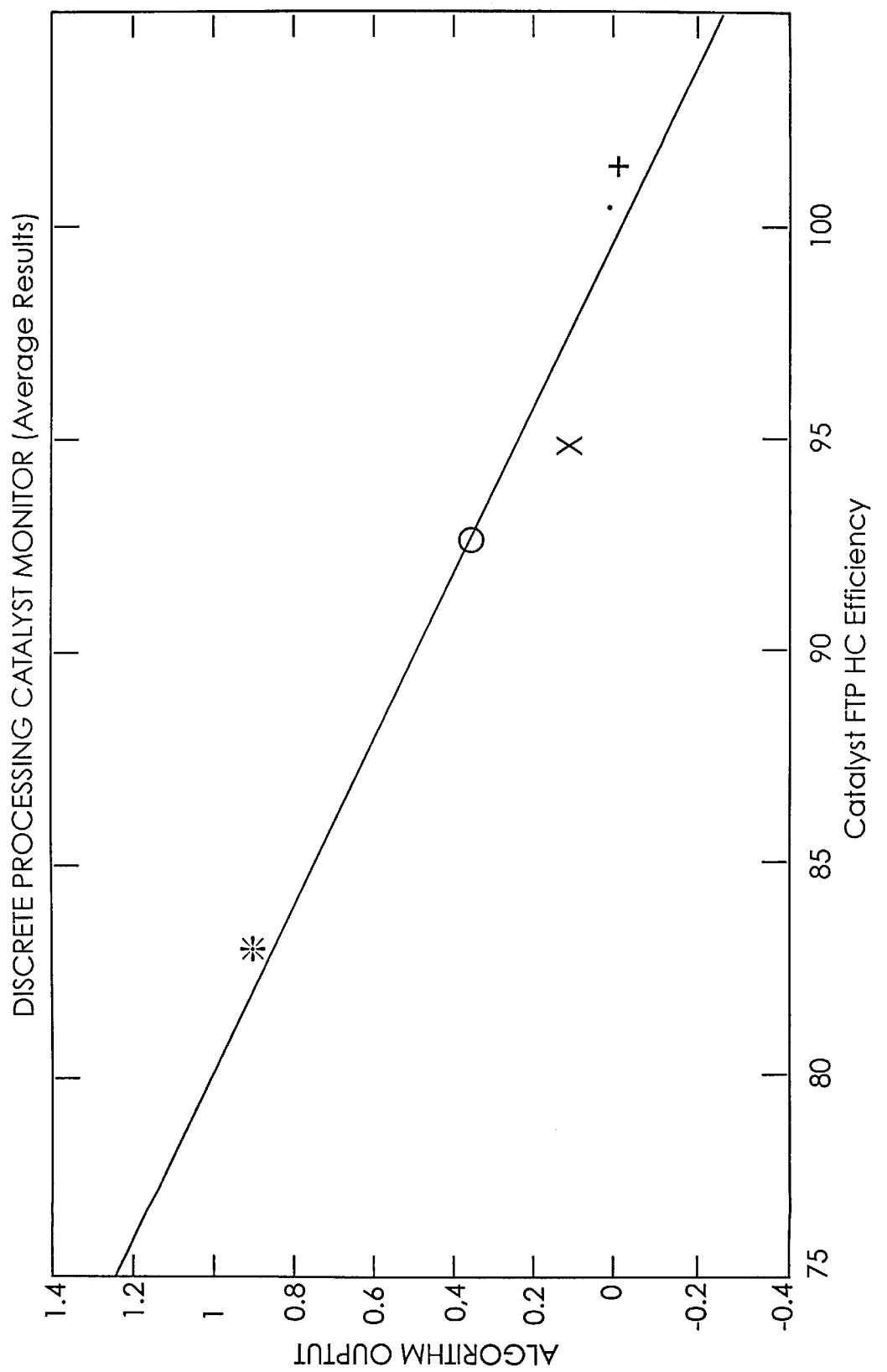
FIG. 6 is a diagram illustrating the linear relationship between algorithm output and catalyst efficiency as determined in accordance with the present invention.

As depicted in FIGS. 5A–5D, catalyst monitor 20 of the present invention has been realized in Simulink\Matlab software running on a rapid prototyping controller. Using this implementation, real-time testing was performed on a standard test vehicle having a 2.0 liter, inline 4 cylinder internal combustion engine. This testing employed a standard 3-way catalyst and was conducted under various steady state and transient driving conditions as prescribed by government test procedures (i.e., FTP). Using five catalysts, each with a different efficiency, the present invention produced a repeatable and robust linear relationship between the different catalysts and its corresponding output as shown in FIG. 6. Although FIG. 6 shows HC catalyst efficiency, the present invention is also applicable for monitoring CO and $NO_x$ catalyst efficiencies.

While the above description constitutes the preferred embodiment of the invention, it will be appreciated that the invention is susceptible to modification, variation, and change without departing from the proper scope or fair meaning of the accompanying claims.

We claim:

1. An apparatus for monitoring catalyst efficiency in a catalytic converter of a motor vehicle, comprising:

a first nonlinear oxygen sensor positioned between a vehicle engine and the catalytic converter for generating a first electrical signal indicative of oxygen in an exhaust gas;

a first filter receiving said first signal from said first oxygen sensor and filtering said first signal at a range of frequencies, wherein said range of frequencies is selected such that a first filtered signal is indicative of catalyst efficiency;

a second nonlinear oxygen sensor positioned after the catalytic converter for generating a second electrical signal indicative of oxygen in said exhaust gas;

a second filter receiving said second signal from said second oxygen sensor and filtering said second signal at said range of frequencies, wherein said range of frequencies is selected such that a second filtered signal is indicative of catalyst efficiency; and a signal combiner for establishing a normalized signal ratio by dividing said first filtered signal with said second filtered signal, such that said signal ratio linearly correlates to catalyst efficiency for the catalytic converter.

2. The apparatus of claim 1 further comprising a means for translating said ratio signal into a catalyst efficiency value.

3. The apparatus of claim 2 further comprising a means for detecting a stabilized signal ratio prior to translating said signal ratio into said catalyst efficiency value.

4. The apparatus of claim 3 wherein means for detection includes:

a third filter receiving said signal ratio and generating an averaged signal indicative of the average change of said signal ratio;

a reciprocator receiving said ratio signal and generating a reciprocal signal of said signal ratio; and an equalizer receiving said averaged signal and said reciprocal signal, and normalizing said averaged signal with respect to said reciprocal signal, thereby generating an output signal indicative of the stability of said signal ratio.

5. The apparatus of claim 1 wherein at least one of said first filter and said second filter further includes:

a bandpass filter receiving at least one of said first signal and second signal and filtering said signal at a range of frequencies, said signal being indicative of catalyst efficiency at said frequencies;

a rectifier receiving said signal from said bandpass filter and converting said signal to an absolute value of said signal; and a low pass filter receiving said signal from said rectifier and determining an average signal of said signal.

6. The apparatus of claim 5 wherein said band pass filter being a finite impulse response filter, said filter passing a range of frequencies on the order of 1 to 9 Hertz.

7. The apparatus of claim 1 further comprises a sampler receiving at least one of said first and second signals from at least one of the said first filter and said second filter and determining a signal value representative of the signal.

8. A method of monitoring catalyst efficiency in a catalytic converter of a motor vehicle, comprising the steps of:

detecting a first electrical signal being indicative of oxygen in an exhaust gas using a first nonlinear oxygen sensor positioned between a vehicle engine and the catalytic converter;

filtering said first signal at a range of frequencies, wherein said range of frequencies is selected such that a first filtered signal indicative of catalyst efficiency;

detecting a second electrical signal being indicative of oxygen in an exhaust gas using a second nonlinear oxygen sensor positioned after the catalytic converter;

filtering said second signal at said range of frequencies, wherein said range of frequencies is selected such that a second filtered signal indicative of catalyst efficiency; and establishing a normalized signal ratio by dividing said first filtered signal with said second filtered signal, such that said signal ratio linearly correlates to catalyst efficiency of the catalytic converter.

9. The method of claim 8 further comprising the step of translating said signal ratio into a catalyst efficiency value.

10. The method of claim 9 further comprising the step of detecting a stabilized signal ratio prior to the step of translating said signal ratio.

11. The method of claim 10 wherein the step of detecting a stabilized ratio signal further comprises:

generating an averaged signal indicative of the average change of said signal ratio from said signal ratio;

reciprocating said signal ratio into a reciprocal signal; and normalizing said averaged signal with respect to said reciprocal signal, thereby generating an output signal indicative of the stability of said signal ratio.

12. The method of claim 8 wherein said step of filtering said first signal further comprises using a finite impulse response (FIR) filter, said filter passing frequencies on the order of 1 to 9 Hertz.

13. The method of claim 8 further comprises the steps of:

rectifying at least one of said first signal and said second filter using a full-wave rectifier;

averaging said signal using a first low pass filter; and sampling said signal for a signal value representative of said signal prior to the step of establishing said signal ratio.

14. The method of claim 8 further comprises the step of squaring said signal ratio, thereby improving the signal to noise separation.

* * * * *